(12) United States Patent
Handa et al.

(10) Patent No.: US 7,045,556 B2
(45) Date of Patent: May 16, 2006

(54) POLYOLEFIN FOAMS MADE WITH ISOPENTANE-BASED BLOWING AGENTS

(75) Inventors: Y. Paul Handa, Pittsford, NY (US); Jiayan Gu, Farmington, NY (US)

(73) Assignee: Pactiv Corporation, Lake Forest, IL (US)

( * ) Notice: Subject to any disclaimer, the term of this patent is extended or adjusted under 35 U.S.C. 154(b) by 127 days.

(21) Appl. No.: 10/188,263

(22) Filed: Jul. 2, 2002

(65) Prior Publication Data

US 2004/0006149 A1  Jan. 8, 2004

(51) Int. Cl.
 *C08J 9/12* (2006.01)
 *C08J 9/14* (2006.01)

(52) U.S. Cl. .......................... 521/98; 142/143
(58) Field of Classification Search .................. 521/98, 521/142, 143, 144
See application file for complete search history.

(56) References Cited

U.S. PATENT DOCUMENTS

| | | | |
|---|---|---|---|
| 3,431,164 A | 3/1969 | Gilbert | 161/161 |
| 3,432,447 A | 3/1969 | Patterson et al. | 260/2.5 |
| 3,644,230 A | 2/1972 | Cronin | 260/2.5 |
| 3,863,000 A | 1/1975 | Kasai et al. | 264/45.5 |
| 4,198,363 A | 4/1980 | Noel | 264/45.9 |
| 4,217,319 A | 8/1980 | Komori | 264/53 |
| 4,255,372 A | 3/1981 | Kühnel et al. | 264/54 |
| 4,289,857 A | 9/1981 | Hoki et al. | 521/85 |
| 4,331,779 A | 5/1982 | Park | 521/134 |
| 4,343,913 A | 8/1982 | Watanabe et al. | 521/94 |
| 4,344,710 A | 8/1982 | Johnson et al. | 366/76 |
| 4,345,041 A | 8/1982 | Hoki et al. | 521/94 |
| 4,359,539 A | 11/1982 | Hoki et al. | 521/79 |
| 4,369,257 A | 1/1983 | Hoki et al. | 521/79 |
| 4,424,287 A | 1/1984 | Johnson et al. | 521/74 |
| 4,470,938 A | 9/1984 | Johnson | 264/50 |
| 4,485,059 A | 11/1984 | Krutchen et al. | 264/51 |
| 4,528,221 A | 7/1985 | Komatsuzaki et al. | 428/35 |
| 4,528,300 A | 7/1985 | Park | 521/79 |
| 4,569,950 A | 2/1986 | Hoshi et al. | 521/88 |
| 4,644,013 A | 2/1987 | Fujie et al. | 521/60 |
| 4,652,590 A | 3/1987 | Hoki et al. | 521/139 |
| 4,694,027 A | 9/1987 | Park | 521/94 |
| 4,847,150 A | 7/1989 | Takeda | 428/318.8 |
| 4,956,395 A | 9/1990 | Leduc | 521/79 |
| 5,059,376 A | 10/1991 | Pontiff et al. | 264/234 |
| 5,089,533 A | 2/1992 | Park | 521/79 |
| 5,124,097 A | 6/1992 | Malone | 264/51 |
| 5,225,451 A | 7/1993 | Rogers et al. | 521/94 |
| 5,286,429 A | 2/1994 | Blythe et al. | 264/51 |
| 5,290,822 A | 3/1994 | Rogers et al. | 521/94 |
| 5,348,984 A | 9/1994 | Lee | 521/79 |
| 5,356,944 A | 10/1994 | Blythe et al. | 521/146 |
| 5,424,016 A | 6/1995 | Kolosowski | 264/156 |
| 5,453,454 A | 9/1995 | Alicke et al. | 521/79 |
| 5,460,818 A | 10/1995 | Park et al. | 426/415 |
| 5,462,974 A | 10/1995 | Lee | 521/79 |
| 5,562,857 A | 10/1996 | Werner et al. | 252/67 |
| 5,576,094 A | 11/1996 | Callens et al. | 428/220 |
| 5,585,058 A | 12/1996 | Kolosowski | 264/156 |
| 5,667,928 A | 9/1997 | Thomas et al. | 430/134 |
| 5,672,294 A | 9/1997 | Lund et al. | 252/67 |
| 5,939,463 A | 8/1999 | Wu et al. | 521/97 |
| 6,069,183 A | 5/2000 | Wilkes et al. | 521/139 |
| 6,136,875 A | 10/2000 | Wu et al. | 521/97 |
| 6,225,363 B1 | 5/2001 | Wilkes et al. | 521/81 |

FOREIGN PATENT DOCUMENTS

| | | |
|---|---|---|
| AU | 52724/79 | 5/1980 |
| DE | 42 01 763 | 1/1991 |
| EP | 0 647 673 A2 | 10/1986 |
| EP | 0 585 147 A1 | 7/1993 |
| JP | 5141149 | 11/1976 |
| JP | 3-63123 | 3/1991 |
| JP | 2623136 | 4/1997 |
| JP | 9231337 | 9/1997 |

OTHER PUBLICATIONS

PCT Search Report dated Aug. 19, 2003 for International Application No. PCT/US03/18151, filed Jun. 10, 2003 (3 pages).

V. Firdaus, P.P. Tong, K.K. Cooper and Mobil Chemical Company, "*A Developmental HDPE Foam Resin*" Edison NJ, pp. 1931–1936 (1996).

Krutchen, et al., "Gas Chromatographic Determination of Residual Blowing Agents in Polystyrene Foams," *Proceeding SPE ANTEC '88* (1988), pp. 704–706.

General Purpose Polystyrene, *Encyclopedia of Polymer Science and Engineering*, J. Wiley & Sons, 2nd Edition, vol. 16, pp. 62–71 (1989).

Zwolinski et al., Extruded Polystyrene Foam With CFC/Carbon Dioxide Blowing Agents, *ANTEC 1986*, pp. 30–33 (1986).

*Primary Examiner*—Morton Foelak
(74) *Attorney, Agent, or Firm*—Jenkens & Gilchrist

(57) ABSTRACT

A blowing agent blend for making polyolefin foams comprising isopentane and at least one co-blowing agent. The co-blowing agent is either a physical co-blowing agent having a boiling point less than 28° C., or a chemical co-blowing agent, or combinations thereof. The blowing agent blend comprises less than about 99 mol % isopentane.

62 Claims, 1 Drawing Sheet

POLYOLEFIN FOAMS MADE WITH ISOPENTANE-BASED BLOWING AGENTS

FIELD OF INVENTION

The present invention relates generally to foams using blowing agent blends or mixtures, and processes of making the same. More particularly, the present invention relates to polyolefin foams using isopentane-based blowing agent blends that produce a stable foam with minimized or no corrugation, and processes of making the same.

BACKGROUND OF THE INVENTION

Polyolefin foam, such as low density polyethylene foam, is commonly made by combining a physical blowing agent with molten polyethylene resin under pressure and, after thorough mixing, extruding the combination through an appropriate die into a lower pressure atmosphere.

In the past, physical blowing agents widely used for making polyolefin foams were chlorofluorocarbons and hydrochlorofluorocarbons. Use of such blowing agents, however, has been or will be banned because of environmental concerns.

Presently, physical blowing agents more commonly used for making low density polyethylene (LDPE) foams are hydrocarbons such as isobutane or blends of isobutane and n-butane. Other hydrocarbons such as ethane and propane have been used more recently in making LDPE foams. The ability of isobutane, n-butane, propane, ethane and combinations thereof to give stable, low density foams depends on factors such as desirable solubility in low density polyethylene, and the ability of gas permeation modifiers to slow down the escape of such blowing agents. The resultant foam article (e.g., a sheet) using such blowing agents is frequently produced with at least some corrugation. Corrugation occurs when the radial rate of expansion is higher than the radial space available for the foam as it exits the die. Corrugation may be reduced to a certain extent by optimizing the foaming process and apparatus used in forming the foam with these blowing agents, but a low degree of corrugation or visible corrugation lanes often remain. The corrugation becomes more pronounced when a fluid with a very low boiling point (e.g., ethane or propane) is (a) used as the sole blowing agent or (b) present in an amount greater than about 5 mol % with a higher boiling fluid (e.g, isobutane). Corrugation also tends to occur more frequently in sheets (thickness of up to about ½ inch) as opposed to planks (thickness of greater than about an inch), and the degree and magnitude of corrugation increase as the foam density decreases.

Therefore, a need exists for a stable foam having minimized or no corrugation, and a process for making the same.

SUMMARY OF THE INVENTION

According to one embodiment of the present invention, a blowing agent blend for making polyolefin foams comprises isopentane and at least one co-blowing agent. The co-blowing agent is either a physical co-blowing agent having a boiling point less than 28° C., or a chemical co-blowing agent, or combinations thereof. The blowing agent blend comprises less than about 99 mol % isopentane. The polyolefin foam may be a low density polyethylene foam. The blowing agent blend may consist essentially of isopentane and the co-blowing agent in which the blowing agent blend includes about 10 to about 99 mol % isopentane with the remainder consisting essentially of the co-blowing agent.

According to another embodiment, a polyolefin foam structure is prepared by the process comprising melting a thermoplastic polyolefin polymer. An effective amount of a blowing agent blend is dissolved in the polyolefin polymer melt. The blowing agent blend comprises less than about 99 mol % isopentane and at least one co-blowing agent. The co-blowing agent is either a physical co-blowing agent having a boiling point less than about 28° C., or a chemical co-blowing agent, or combinations thereof. An extrudate is formed and transferred to an expansion zone. The extrudate is permitted to expand in the expansion zone to produce the polyolefin foam structure that is a substantially closed-cell and dimensionally-stable structure.

According to a process of the present invention, a polyolefin foam structure is produced that comprises melting a thermoplastic polyolefin polymer. An effective amount of a blowing agent blend is dissolved in the polyolefin polymer melt. The blowing agent blend comprises less than about 99 mol % isopentane and at least one co-blowing agent. The co-blowing agent is either a physical co-blowing agent having a boiling point less than about 28° C., or a chemical co-blowing agent, or combinations thereof. An extrudate is formed and is transferred to an expansion zone. The extrudate is permitted to expand in the expansion zone to produce the polyolefin foam structure. The polyolefin foam structure may comprise a low density polyethylene.

BRIEF DESCRIPTION OF THE DRAWINGS

FIGURE is a schematic flow diagram of an overall sequence of operations involved in the manufacture of a foamed polyolefin sheet with the blowing agent blends according to one embodiment of the present invention.

While the invention is susceptible to various modifications and alternative forms, specific embodiments thereof have been shown by way of example in the drawing and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DESCRIPTION OF ILLUSTRATIVE EMBODIMENTS

Figure 1:
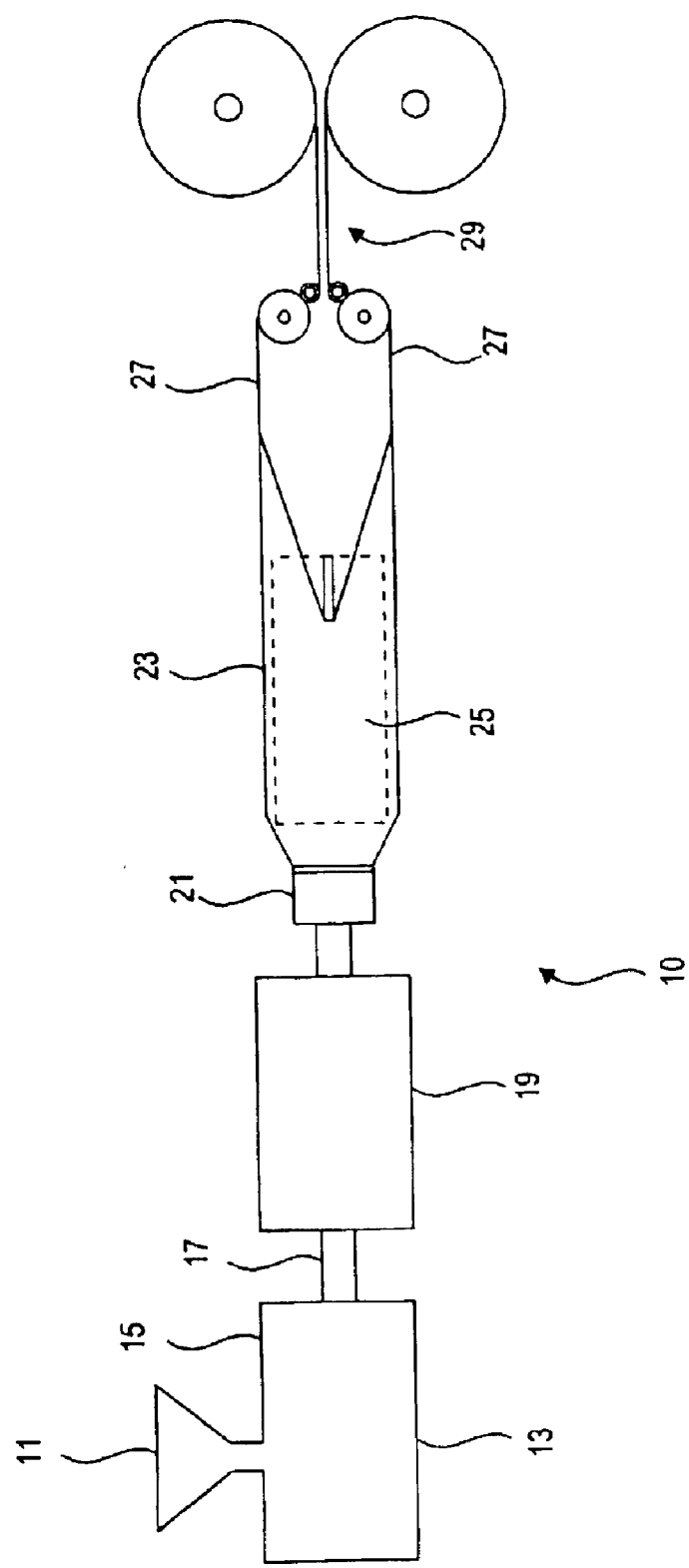

Resins that can be foamed in accordance with the present invention include polyolefin resins such as ethylenic polymers and propylenic polymers. Suitable ethylenic polymer materials include ethylenic homopolymers, and copolymers of ethylenic compounds and copolymerizable ethylenically unsaturated comonomers. The ethylenic polymer material may further include minor proportions of non-ethylenic polymers. The ethylenic polymer material may be comprised solely of one or more ethylenic homopolymers, one or more ethylenic copolymers, a blend of one or more of each of ethylenic homopolymers and copolymers, or blends of any of the foregoing with a non-ethylenic polymer. Regardless of composition, the ethylenic polymer material comprises greater than 50 and preferably greater than 70 wt % of ethylenic monomeric units. Most preferably, the ethylenic polymer material is comprised completely of ethylenic monomeric units. Most preferred ethylenic polymers are polyethylene homopolymers. Polyethylenes may be of the high, medium, low, linear low, or ultra-low density type. Most preferred are low density polyethylenes. The polyethylenes may be linear, branched or cross-linked.

Suitable ethylenic copolymers may be comprised of ethylenic monomeric units and minor amounts, preferably 20 wt % or less, of a monoethylenically unsaturated monomeric unit or units copolymerizable therewith. Suitable comonomers include $C_{1-4}$ alkyl acids and esters, ionomeric derivatives, $C_{2-6}$ dienes and $C_{3-9}$ olefins. Examples of suitable comonomers include acrylic acid, itaconic acid, maleic acid, methacrylic acid, ethacrylic acid, methyl acrylate, methyl methacrylate, ethyl acrylate, vinyl acetate, carbon monoxide, maleic anhydride, acrylonitrile, propylene, isobutylene, and butadiene.

Polypropylene that may be used in the present invention includes polypropylene homopolymer or copolymers. Various polypropylenes that may be suitable in the present invention include, but are not limited to, atactic, isotactic, syndiotactic, long-chain branched, and propylene/ethylene copolymers.

The foam processes of the present invention employ a blowing agent blend or mixture to achieve a stable polyolefin foam with minimized or no corrugation. The blowing agent blend used in forming polyolefin foam is isopentane-based. The blowing agents blend comprises at least isopentane and at least one co-blowing agent. The co-blowing agent(s) can be physical, chemical or combinations thereof. The blowing agent blend comprises less than about 99 mol % isopentane.

A physical co-blowing agent is defined herein as having a boiling point less than 28° C. The co-blowing agent is fast expanding as compared to a pure isopentane blowing agent. The physical blowing agent may be inorganic or organic. Some suitable inorganic blowing agents include, but are not limited to, air, nitrogen, argon, xenon, carbon dioxide, sulfur hexafluoride, nitrous oxide, ammonia, silicon tetrafluoride, nitrogen trifluoride, boron trifluoride, and boron trichloride.

Some examples of organic co-blowing agents that may be used in the present invention include, but are not limited to, hydrocarbons, halogenated hydrocarbons, fluids with polar groups, and combinations thereof. Hydrocarbons include, but are not limited to, methane, ethane, propane, cyclopropane, n-butane, isobutane, cyclobutane, and neopentane. Halogenated hydrocarbons include, but are not limited to, methyl fluoride, difluoromethane (HFC-32), trifluoromethane (HFC-23), perfluoromethane, chlorodifluoromethane (HCFC-22), methylene chloride, ethyl chloride, ethyl fluoride, 1,1-difluoroethane (HFC-152a), 1,1,1-trifluoroethane (HFC-143a), 1,1,1,2-tetrafluoroethane (HFC-134a), 1,1,2,2-tetrafluoroethane (HFC-134), pentafluoroethane (HFC-125), perfluoroethane, 1,1-dichloro-1-fluoroethane (HCFC-141b), 1-chloro-1,1-difluoroethane (HCFC-142b), 1,1-dichloro-2,2,2-trifluoroethane (HCFC-123), and 1-chloro-1,2,2,2-tetrafluoroethane (HCFC-124), difluoropropane, 1,1,1-trifluoropropane, 1,1,1,3,3-pentafluoropropane (HFC-245fa), perfluoropropane, perfluorobutane, perfluorocyclobutane, and vinyl fluoride. Fluids with polar groups include, but are not limited to, dimethyl ether, vinyl methyl ether, methyl ethyl ether, dimethyl fluoroether, diethyl fluoroether, perfluorotetrahydrofuran, dimethylamine, trimethylamine, ethylamine, and perfluoroacetone.

Chemical co-blowing agents that may be used include azodicarbonamide, azodiisobutyro-nitrile, benzenesulfonhydrazide, 4,4-oxybenzene sulfonylsemicarbazide, p-toluene sulfonyl semicarbazide, barium azodicarboxylate, N,N'-dimethyl-N,N'-dinitrosoterephthalamide, trihydrazino triazine, and other azo, N-nitroso, carbonate, and sulfonyl hydrazides. There are also various acid/bicarbonate mixtures that decompose into gases when heated. For example, mixtures of citric acid and sodium bicarbonate sold under the name HYDROCEROL® can be employed as chemical co-blowing agents.

The total amount of the blowing agent blend used depends on conditions such as extrusion-process conditions at mixing, the blowing agent blend being used, the composition of the extrudate, and the desired density of the foamed article. The extrudate is defined herein as including the blowing agent blend, a polyolefin resin(s), and any additives. For a foam having a density of from about 1 to about 15 $lb/ft^3$, the extrudate typically comprises from about 18 to about 1 wt % of blowing agent.

The blowing agent blend used in the present invention comprises less than about 99 mol % isopentane. The blowing agent blend generally comprises from about 10 mol % to about 60 or 75 mol % isopentane. The blowing agent blend more typically comprises from about 15 mol % to about 40 mol % isopentane. More specifically, the blowing agent blend comprises from about 25 or 30 mol % to about 40 mol % isopentane. The blowing agent blend generally comprises at least about 15 or 30 mol % of co-blowing agent(s). More specifically, the blowing agent blend comprises from about 40 to about 85 or 90 mol % of co-blowing agent(s). The blowing agent blend more typically comprises from about 60 mol % to about 70 or 75 mol % of co-blowing agent(s).

A nucleating agent or combination of such agents may be employed in the present invention for advantages, such as its capability for regulating cell formation and morphology. A nucleating agent, or cell size control agent, may be any conventional or useful nucleating agent(s). The amount of nucleating agent used depends upon the desired cell size, the selected blowing agent blend, and the desired foam density. The nucleating agent is generally added in amounts from about 0.02 to about 20 wt % of the polyolefin resin composition.

Some contemplated nucleating agents include inorganic materials (in small particulate form), such as clay, talc, silica, and diatomaceous earth. Other contemplated nucleating agents include organic nucleating agents that decompose or react at the heating temperature within an extruder to evolve gases, such as carbon dioxide and/or nitrogen. One example of an organic nucleating agent is a combination of an alkali metal salt of a polycarboxylic acid with a carbonate or bicarbonate. Some examples of alkali metal salts of a polycarboxylic acid include, but are not limited to, the monosodium salt of 2,3-dihydroxy-butanedioic acid (commonly referred to as sodium hydrogen tartrate), the monopotassium salt of butanedioic acid (commonly referred to as potassium hydrogen succinate), the trisodium and tripotassium salts of 2-hydroxy-1,2,3-propanetricarboxylic acid (commonly referred to as sodium and potassium citrate, respectively), and the disodium salt of ethanedioic acid (commonly referred to as sodium oxalate), or polycarboxylic acid such as 2-hydroxy-1,2,3-propanetricarboxylic acid. Some examples of a carbonate or a bicarbonate include, but are not limited to, sodium carbonate, sodium bicarbonate, potassium carbonate, potassium bicarbonate, and calcium carbonate.

It is contemplated that mixtures of different nucleating agents may be added in the present invention. Some more desirable nucleating agents include talc, crystalline silica, and a stoichiometric mixture of citric acid and sodium bicarbonate (the stoichiometric mixture having a 1 to 100 percent concentration where the carrier is a suitable polymer such as polyethylene). Talc may be added in a carrier or in a powder form.

Gas permeation agents or stability control agents may be employed in the present invention to assist in preventing or inhibiting collapsing of the foam. The stability control agents suitable for use in the present invention may include the partial esters of long-chain fatty acids with polyols described in U.S. Pat. No. 3,644,230, saturated higher alkyl amines, saturated higher fatty acid amides, complete esters of higher fatty acids such as those described in U.S. Pat. No. 4,214,054, and combinations thereof described in U.S. Pat. No. 5,750,584.

The partial esters of fatty acids that may be desired as a stability control agent include the members of the generic class known as surface active agents or surfactants. A preferred class of surfactants includes a partial ester of a fatty acid having 12 to 18 carbon atoms and a polyol having three to six hydroxyl groups. More preferably, the partial esters of a long chain fatty acid with a polyol component of the stability control agent is glycerol monostearate, glycerol distearate or mixtures thereof. It is contemplated that other gas permeation agents or stability control agents may be employed in the present invention to assist in preventing or inhibiting collapsing of the foam.

If desired, fillers, colorants, light and heat stabilizers, anti-oxidants, acid scavengers, flame retardants, processing aids, extrusion aids and foaming additives may be used in making the foam.

A conventional two-extruder tandem system with each extruder having a single screw may be used for extruding the foam article of the present invention. Alternatively, a two-extruder tandem system in which the primary extruder is a twin screw, and the secondary extruder is a single screw may be used for extruding the foam article of the present invention. A single extruder with proper cooling may also be employed in the present invention.

According to one process of the present invention, polyolefin resin pellets (e.g., a low density polyethylene) are admixed with a nucleating agent, such as talc, and a stability control agent, such as glycerol monostearate. These materials are continuously fed into a hopper of an extruder. The feed mixture is conveyed forward by a screw within a barrel of the extruder as the mixture is mixed, compressed, heated, and converted to molten form. The conversion to molten form occurs prior to reaching an injection zone where the blowing agent is added. The blowing agent blend of the present invention may be injected into the polyolefinic composition at a point where the polymer is in a melt state (i.e., beyond the feed zone).

After injecting the blowing agent blend, the mixture is continuously mixed at pressures to ensure a homogeneous solution of the resin and the blowing agent blend. The molten mixture is then conveyed into a cooling zone where additional mixing takes place. After cooling, the mixture may be extruded into a holding zone maintained at a temperature and pressure that prevents or inhibits foaming of the mixture. The holding zone has (a) an outlet die having an orifice opening into a zone of lower pressure such as atmospheric pressure at which the mixture foams, (b) means for closing the orifice without disturbing the foamable mixture within the holding zone, and (c) opening means for allowing the foamable mixture to be ejected from the holding zone. An example of a holding zone is described in U.S. Pat. No. 4,323,528. Regardless of whether a holding zone is used, the mixture is then extruded through a die into a lower pressure zone, such as atmospheric pressure.

According to one embodiment, a two-extruder tandem system 10 of the FIGURE may be used for extruding a polyolefin foam article (e.g., a sheet) of the present invention. Polyolefin resin pellets such as polyethylene are mixed with at least one additive (e.g., a nucleating agent and/or stability control agent) to form a feed mixture which is fed continuously into a hopper 11 of a primary extruder 13. The feed mixture is conveyed forward by a helical screw within a barrel of the extruder as the feed mixture is mixed, compressed, heated and melted prior to reaching the blowing agent-injection zone. The blowing agent blend (at least isopentane and one co-blowing agent) is added at point 15. Thus, the blowing agent blend of the present invention is injected into the polyethylene/additives mixture (feed mixture) at a point beyond the feed zone where the polyethylene is melted. It is contemplated that the blowing agent blend may be injected at other locations, including into a secondary extruder.

Following injection of the blowing agent blend, the mixture is continuously mixed in the primary extruder 13. The exit pressure of the primary extruder 13 is generally in the range of from about 1200 to about 2500 psi. The temperature of the primary extruder 13 is generally in the range of from about 300 to about 400° F. The mixture is subsequently passed, at a high enough pressure that the blowing agent blend remains in solution, through a hollow adapter section 17 into a cooled secondary tandem extruder 19. The molten mixture is passed along the length of the cooled secondary extruder at low shear where cooling and additional mixing occur. The exit pressure of the secondary extruder 19 is generally in the range of from about 400 to about 1200 psi. The temperature of the extrudate from the secondary extruder 19 is generally in the range of from about 205 to about 220° F. In general, the temperature of the primary extruder should be sufficient to melt the polymer and any additives, and to promote efficient mixing. The temperature and pressure in the secondary extruder should be sufficient to keep the polymer and the blowing agent blend as a homogeneous solution. The mixture is then expressed through an annular die 21, though a die of a different configuration, such as a flat die, may also be used. The foamable polyethylene polymer is extruded through the annular die 21 in the form of an elongated bubble or tube 23. The foamable polyethylene polymer in the FIGURE is expanded and drawn over a cylindrical surface of a cooling and sizing drum 25, and slit to form sheet stock 27. The sheet stock 27 is taken up on one or more winding reels 29.

If the article produced is a sheet, the thickness of the sheet can be up to about 0.5 inch. If the article produced is a plank, the thickness is generally greater than about one inch. The articles produced from the extruded tube are generally from about 0.020 to about 0.25 inch in thickness.

The resulting foamed article generally has a density from about 1 to about 15 lb/ft$^3$, more typically from about 2.0 to about 9.0 lb/ft$^3$. When in sheet form, the foamed article is preferably "low density" which is defined herein as being less than 3 lb/ft$^3$. The resultant foamed article has a substantially closed-cell structure and is defined herein as a foam having greater than about 85% closed cells and, more typically, greater than about 95% closed cells.

The polyolefin foams are light in weight and may be used as protective or flexible packaging for delicate goods such as computers, glassware, televisions, furniture, and any article that needs to be protected from gouging, surface-scratching or marring. It is contemplated that the polyolefin foams of the present invention may be used in other applications such as floor underlayments, flotation foam (e.g., life jackets), toys and recreational parts. Generally speaking, foam sheets are used in flexible packaging, while foam planks are used in protective packaging. In addition to foam sheets and planks, the present invention may take the form of other shapes such as rods.

The resulting polyolefin foam of the present invention is preferably "dimensionally stable." Dimensional stability as defined herein is when the density of the foam does not deviate more than about 15% (i.e., the foam does not either shrink more than about 15% or expand more than about 15%) from the density of the polyolefin foam at the time of production. The density of the polyolefin foam at the time of production refers to its density within about 15 minutes, and preferably within 10 minutes, after the foam exits the die. This measurement is used in determining the "fresh" density of the foam. To have a dimensionally stable product, the foam is typically measured after an aging process (e.g., for LDPEs from about 5 to about 30 days) and compared to its fresh density. It is recognized, however, that in the unlikely event that the foam at a later duration is not within about 15% of its fresh density, then it is not a dimensionally stable product. It is preferable that the foam does not deviate more than about 10% from its "fresh" density.

It is desirable for some polyolefin foams of the present invention to have a certain number of cells per inch. For example, it is desirable to have at least 20 or 25 cells per inch, and more preferably 30 cells per inch in both the machine and cross-machine directions for a foam that is about 100 mils thick.

EXAMPLES

Various blowing agents were tested with the results shown below in Tables 1 and 2. Specifically, several foams were made from comparative blowing agents and inventive blowing agent blends. It should be noted that in the various examples reported in Tables 1 and 2, the hardware was the same and operated in exactly the same way, the only variable was the blowing agent blend. All of the inventive blowing agent blends included (a) isopentane and (b) either ethane, n-propane, isobutane, butanes (a combination of isobutane and n-butane), 1,1,1,2-tetrafluoroethane (HFC-134a), dimethyl ether, or combinations thereof. The comparative blowing agents did not include isopentane, but rather included either ethane, n-propane, isobutane, butanes (a combination of isobutane and n-butane), HFC-134a, or combinations thereof.

Each of the foams was made with low density polyethylene (LDPE) having a density of 0.920 g/cm$^3$ and a melt index of 2.0 g/10 min at 190° C. In addition to the blowing agents and the LDPE resin, glycerol monostearate and talc were added in forming the foams. Glycerol monostearate, a stability control agent, was added at a concentration level of about 1 wt % of the total solids, and, talc, a nucleating agent, was added at a concentration level of about 0.1 to 1.0 wt % of total solids.

Each of the foam samples, except Inventive Foams 5, 10, and 11, was made on a pilot line. The pilot line is a tandem extrusion line employing 2.5 inch and 3.5 inch single-screw extruders equipped with three ports in the primary extruder for injecting compressed fluids. The foaming temperature used in the pilot line was 107° C. and the foams were produced with a blow-up ratio of either 3.7 or 4.1. The blow-up ratio used to make each foam is identified in the footnotes to Tables 1 and 2 below. The extruded foam tube was stabilized over a mandrel, and then slit to form a sheet.

Unlike the other foams reported in Tables 1 and 2, Inventive Foams 5, 10 and 11 were made on a miniline. The miniline is a tandem extrusion line employing 1.25 inch and 1.5 inch single-screw extruders. Otherwise, the operating conditions of the miniline were the same as those of the pilot line described above.

The densities of the resulting foams were measured using ASTM D3575. The corrugation, if any, of the foam was determined as twice the amplitude of the sine wave that rides along the circumference of the extruded tube. The corrugation of the foams made on the miniline (Inventive Foams 5, 10, and 11) was not measured because of the small sample size.

TABLE 1[1,2,3]

| | Blowing Agent (Composition in mol %) | | | | | | | | | No. of | |
| --- | --- | --- | --- | --- | --- | --- | --- | --- | --- | --- | --- |
| Sample No (Comp/Inv)[4] | Ethane | n-C3[5] | HFC-134a | DME[6] | i-C4[7] | Butanes[8] | i-C5[9] | Density (lbs/ft$^3$) | Gage (mils) | Cells (Per inch) | Corrugation (mils) |
| Comp 1 | 0 | 0 | 0 | 0 | 0 | 100 | 0 | 2.0 | 125 | 29 | 50 |
| Comp 2 | 0 | 0 | 0 | 0 | 0 | 100 | 0 | 1.2 | 128 | 30 | 87 |
| Comp 3 | 0 | 0 | 0 | 0 | 100 | 0 | 0 | 1.2 | 127 | 28 | 235 |
| Comp 4 | 0 | 0 | 0 | 0 | 100 | 0 | 0 | 2.0 | 127 | 30 | 35 |
| Inv 5 | 0 | 0 | 0 | 0 | 35 | 0 | 65 | 1.8 | 181 | 11 | NA[10] |
| Inv 6 | 0 | 0 | 0 | 0 | 0 | 70 | 30 | 1.4 | 87 | 24 | 0 |
| Inv 7 | 0 | 0 | 0 | 0 | 50 | 0 | 50 | 1.5 | 78 | 24 | 0 |
| Inv 8 | 0 | 0 | 0 | 0 | 60 | 0 | 40 | 1.3 | 87 | 24 | 0 |
| Inv 9 | 0 | 0 | 0 | 0 | 68 | 0 | 32 | 2.0 | 127 | 30 | 0 |
| Inv 10 | 0 | 0 | 15 | 0 | 0 | 0 | 85 | 3.2 | 130 | 12 | NA |
| Inv 11 | 0 | 0 | 30 | 0 | 0 | 0 | 70 | 3.5 | 130 | 15 | NA |
| Comp 12 | 0 | 100 | 0 | 0 | 0 | 0 | 0 | 2.1 | 110 | 28 | 80 |
| Comp 13 | 0 | 100 | 0 | 0 | 0 | 0 | 0 | 1.2 | 98 | 33 | 107 |
| Inv 14 | 0 | 80 | 0 | 0 | 0 | 0 | 20 | 2.0 | 98 | 28 | 0 |
| Inv 15 | 0 | 47 | 13 | 0 | 0 | 0 | 40 | 1.2 | 98 | 28 | 40 |
| Inv 16 | 0 | 15 | 0 | 0 | 70 | 0 | 15 | 2.2 | 123 | 30 | 0 |
| Inv 17 | 0 | 7 | 0 | 0 | 68 | 0 | 25 | 2.0 | 127 | 30 | 0 |
| Inv 18 | 0 | 14 | 0 | 0 | 66 | 0 | 20 | 2.0 | 125 | 30 | 0 |

[1]Comparative Samples 1, 2, 12 and 13, and Inventive Samples 6–8 and 14–15 were made on the pilot line with a blow-up ratio of 4.1
[2]Comparative Samples 3 and 4, and Inventive Samples 9 and 16–18 were made on the pilot line with a blow-up ratio of 3.7
[3]Inventive Samples 5, 10 and 11 were made on the miniline with a blow-up ratio of 3
[4]"Comp" = Comparative Sample, "Inv" = Inventive Sample
[5]n-C3 = n-propane
[6]DME = Dimethyl ether
[7]i-C4 = Isobutane
[8]Butanes = A blend of 65 mol % isobutane and 35 mol % n-butane, generally known as A26
[9]i-C5 = Isopentane
[10]NA = Not Available All of the above foams of Table 1 were dimensionally stable because their density did not deviate more than about 15% as compared to the foam density at the time of production. It was generally observed that the level of corrugation of the foam increased as the relative amount of isopentane was reduced or the relative amount of the co-blowing agent was increased.

Specifically, the corrugation of Comparative Foams 1–4 (a blowing agent of either isobutane or butanes) was greater than the corrugation of Inventive Foams 6–9 (a blowing agent of isopentane with either isobutane or butanes). Compare corrugation levels of 35–235 mils of Comparative Foams 1–4 to 0 mil of Inventive Foams 6–9. Similarly, the corrugation of Comparative Foams 12–13 (a blowing agent of n-propane) was greater than the corrugation of Inventive Foam 14 (a blowing agent of 80 mol % n-propane and 20 mol % isopentane). Compare corrugation levels of 80 and 107 mils of Comparative Foams 12 and 13, respectively, and 0 mil of Inventive Foam 14. It was surprising that the corrugation levels of Inventive Foams 6, 7–9 and 14 decreased significantly as compared to the corrugation levels of Comparative Foams 1–2, 3–4, and 12–13, respectively, by replacing a portion of the butanes, isobutane or n-propane with isopentane.

Compare 75 mils of Comparative Foam 21, and 60 mils of Inventive Foam. Additionally, the corrugation of Comparative Foam 25 (a blowing agent of isobutane and HFC-134a) was greater than the corrugation of Inventive Foam 26 which replaced some of the isobutane with isopentane. Compare corrugation levels of 73 mils of Comparative Foam 25, and 0 mil of Inventive Foam 26. It was surprising that the corrugation levels of Inventive Foams 20, 22 and 26 were less than the corrugation levels of Comparative Foams 19, 21, and 25, respectively, by replacing a portion of the isobutane with isopentane.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A blowing agent blend for making polyolefin foams comprising isopentane and at least one co-blowing agent, the co-blowing agent being (i) a physical co-blowing agent having a boiling point less than 28° C., (ii) a chemical co-blowing agent, or (iii) combinations thereof, and

TABLE 2[1,2]

| Sample No. (Comp/Inv)[3] | Blowing Agent (Compostion in mol %) | | | | | | | No of | | | |
|---|---|---|---|---|---|---|---|---|---|---|---|
| | Ethane | n-C3[4] | HFC 134a | DME[5] | i-C4[6] | Butanes[7] | i-C5[8] | Density (lbs/ft[3]) | Gage (mils) | Cells (Per inch) | Corrugation (mils) |
| Comp 19 | 10 | 0 | 0 | 0 | 90 | 0 | 0 | 2.0 | 102 | 28 | 100 |
| Inv 20 | 10 | 0 | 0 | 0 | 65 | 0 | 25 | 2.0 | 96 | 28 | 80 |
| Comp 21 | 25 | 0 | 0 | 0 | 75 | 0 | 0 | 2.0 | 102 | 30 | 75 |
| Inv 22 | 25 | 0 | 0 | 0 | 45 | 0 | 30 | 2.1 | 94 | 30 | 60 |
| Comp 23 | 40 | 0 | 0 | 0 | 60 | 0 | 0 | 2.0 | 96 | 28 | 60 |
| Inv 24 | 40 | 0 | 0 | 0 | 30 | 0 | 30 | 2.1 | 95 | 28 | 60 |
| Comp 25 | 0 | 0 | 15 | 0 | 85 | 0 | 0 | 1.2 | 87 | 40 | 73 |
| Inv 26 | 0 | 0 | 15 | 0 | 70 | 0 | 15 | 1.9 | 123 | 30 | 0 |
| Inv 27 | 0 | 0 | 13 | 0 | 0 | 57 | 30 | 1.3 | 108 | 26 | 42 |
| Inv 28 | 0 | 0 | 0 | 15 | 70 | 0 | 15 | 1.2 | 127 | 30 | 167 |
| Inv 29 | 0 | 0 | 0 | 15 | 70 | 0 | 15 | 1.9 | 118 | 30 | 105 |
| Inv 30 | 0 | 0 | 0 | 7 | 68 | 0 | 25 | 2.0 | 125 | 30 | 0 |
| Inv 31 | 0 | 0 | 0 | 14 | 57 | 0 | 29 | 2.0 | 122 | 29 | 0 |
| Inv 32 | 0 | 0 | 0 | 13 | 66 | 0 | 21 | 2.1 | 128 | 29 | 0 |

[1]Comparative Sample 25 and Inventive Sample 27 were made on the pilot line with a blow up ratio of 4.1
[2]Comparative Samples 19, 21, and 23 and Inventive Samples 20, 22, 24, 26, and 28–32 were made on the pilot line with a blow up ratio of 3.7
[3]"Comp" = Comparative Sample, "Inv" = Inventive Sample
[4]n-C3 = n-propane
[5]DME = Dimethyl ether
[6]i-C4 = Isobutane
[7]Butanes = A blend of 65 mol % and 35 mol % n-butane, generally known as A26
[8]i-C5 = Isopentane All of the above foams of Table 2 were dimensionally stable because their density did not deviate more than about 15% as compared to the density of the foam at the time of production. It was generally observed that the level of corrugation of the foam increased as the relative amount of isopentane was reduced or the relative amount of the volatile blowing agent was increased, as demonstrated in Inventive Foams 29 and 31. Specifically, the corrugation of Comparative Foam 19 (a blowing agent of 10 mol % ethane and 90 mol % isobutane) was greater than the corrugation of Inventive Foam 20 which replaced some of the isobutane with isopentane. Compare corrugation levels of 100 mils of Comparative Foam 19, and 80 mils of Inventive Foam 20. Similarly, the corrugation of Comparative Foam 21 (a blowing agent of 25 mol % ethane and 75 mol % isopentane) was slightly greater than the corrugation of Inventive Foam 22 in which some of the isobutane was replaced by isopentane.

wherein the blowing agent blend comprises less than about 99 mol % isopentane, and wherein if one of the at least one co-blowing agent is a physical co-blowing agent being isobutane, the blowing agent blend comprises less than 70 mol % isobutane.

2. The blowing agent blend of claim 1, wherein the polyolefin foam is dimensionally stable.

3. The blowing agent blend of claim 1, wherein the co-blowing agent includes at least one physical co-blowing agent, the at least one physical co-blowing agent being methane, ethane, n-propane, n-butane, isobutane, cyclopropane, nitrogen, argon, carbon dioxide, sulfur hexafluoride, nitrous oxide, dimethyl ether, 1,1-difluoroethane (HFC-152a), 1,1,1-trifluoroethane (HFC-143a), 1,1,1,2-tetrafluoroethane (HFC-134a), 1,1,2,2-tetrafluoroet (HFC-134), 1,1,1,3,3-pentafluoropropane (HFC-245fa), or combinations thereof.

4. The blowing agent blend of claim 1, wherein the blowing agent blend includes a chemical co-blowing agent.

5. The blowing agent blend of claim 1, wherein the blowing agent blend comprises from about 10 mol % to about 60 mol % isopentane.

6. The blowing agent blend of claim 5, wherein the blowing agent blend comprises from about 15 mol % to about 40 mol % isopentane.

7. The blowing agent blend of claim 6, wherein the blowing agent blend comprises from about 25 mol % to about 40 mol % isopentane.

8. The blowing agent blend of claim 1, wherein the polyolefin foam comprises polyethylene.

9. The blowing agent blend of claim 1, wherein the polyolefin foam has a density of less than 3 lb/ft$^3$.

10. A polyolefin foam structure prepared by the process comprising the acts of:
melting a thermoplastic polyolefin polymer;
dissolving an effective amount of a blowing agent blend in the polyolefin polymer, the blowing agent blend comprising isopentane and at least one co-blowing agent, the co-blowing agent being (i) a physical co-blowing agent having a boiling point less than 28° C., (ii) a chemical co-blowing agent, or (iii) combinations thereof, and wherein the blowing agent blend comprises less than about 99 mol % isopentane, and wherein if one of the at least one co-blowing agent is a physical co-blowing agent being isobutane, the blowing agent blend comprises less than 70 mol % isobutane;
forming an extrudate;
transferring the extrudate to an expansion zone; and
permitting the extrudate to expand in the expansion zone to produce the polyolefin foam structure, the polyolefin foam structure being a substantially closed-cell and dimensionally-stable structure.

11. The polyolefin foam structure of claim 10, wherein the extrudate comprises from about 1 to about 18 wt % blowing agent.

12. The polyolefin foam structure of claim 10, wherein the polyolefin foam structure has at least 20 cells per inch.

13. The polyolefin foam structure of claim 12, wherein the polyolefin foam structure has at least 25 cells per inch.

14. The polyolefin foam structure of claim 13, wherein the polyolefin foam structure has at least 30 cells per inch.

15. The polyolefin foam structure of claim 10, wherein the polyolefin foam structure is a sheet.

16. The polyolefin foam structure of claim 10, wherein the polyolefin foam structure is a plank.

17. The polyolefin foam structure of claim 10 further including mixing a nucleating agent and the thermoplastic polyolefin polymer to form a mixture, and dissolving an effective amount of the blowing agent blend into the mixture.

18. The polyolefin foam structure of claim 10 further including
melting a stability control agent,
mixing the stability control agent and the thermoplastic polyolefin polymer to form a mixture, and
dissolving an effective amount of the blowing agent blend into the mixture.

19. The polyolefin foam structure of claim 10, wherein the polyolefin foam structure comprises polyethylene.

20. The polyolefin foam structure of claim 19, wherein the polyolefin foam structure comprises low density polyethylene.

21. The polyolefin foam structure of claim 10, wherein the polyolefin foam structure has a density of less than 3 lb/ft$^3$.

22. A process for making a polyolefin foam structure comprising the acts of:
melting a thermoplastic polyolefin polymer;
dissolving an effective amount of a blowing agent blend in the polyolefin polymer, the blowing agent blend comprising isopentane and at least one co-blowing agent, the co-blowing agent being (i) a physical co-blowing agent having a boiling point less than 28° C., (ii) a chemical co-blowing agent, or (iii) combinations thereof, and wherein the blowing agent blend comprises less than about 99 mol % isopentane, and wherein if one of the at least one co-blowing agent is a physical co-blowing agent being isobutane, the blowing agent blend comprises less than 70 mol % isobutane;
forming an extrudate;
transferring the extrudate to an expansion zone; and
permitting the extrudate to expand in the expansion zone to produce the polyolefin foam structure.

23. The process of claim 22, wherein the polyolefin structure is a substantially closed-cell and dimensionally stable structure.

24. The process of claim 22, wherein the extrudate comprises from about 1 to about 18 wt % blowing agent.

25. The process of claim 22 further including mixing a nucleating agent and the thermoplastic polyolefin polymer to form a mixture, and dissolving an effective amount of the blowing agent blend into the mixture.

26. The process of claim 22 further including
melting a stability control agent,
mixing the stability control agent and the thermoplastic polyolefin polymer to form a mixture, and
dissolving an effective amount of the blowing agent blend into the mixture.

27. The process of claim 22, wherein the co-blowing agent includes at least one physical co-blowing agent, the at least one physical co-blowing agent being methane, ethane, n-propane, n-butane, isobutane, cyclopropane, nitrogen, argon, carbon dioxide, sulfur hexafluoride, nitrous oxide, dimethyl ether, 1,1-difluoroethane (HFC-152a), 1,1,1-trifluoroethane (HFC-143a), 1,1,1,2-tetrafluoroethane (HFC-134a), 1,1,2,2-tetrafluoroethane (HFC-134), 1,1,1,3,3-pentafluoropropane (HFC-245fa), or combinations thereof.

28. The process of claim 22, wherein the blowing agent blend includes a chemical co-blowing agent.

29. The process of claim 22, wherein the blowing agent blend comprises from about 10 mol % to about 60 mol % isopentane.

30. The process of claim 29, wherein the blowing agent blend comprises from about 15 mol % to about 40 mol % isopentane.

31. The process of claim 30, wherein the blowing agent blend comprises from about 25 mol % to about 40 mol % isopentane.

32. The process of claim 22, wherein the polyolefin foam structure comprises polyethylene.

33. The process of claim 32, wherein the polyolefin foam structure comprises low density polyethylene.

34. The process of claim 22, wherein the polyolefin foam structure has a density of less than 3 lb/ft$^3$.

35. A blowing agent blend for foaming low density polyethylene foam consisting essentially of from about 10 to about 99 mol % isopentane and at least one co-blowing agent, the co-blowing agent being (i) a physical co-blowing agent having a boiling point less than 28° C., (ii) a chemical co-blowing agent, or (iii) combinations thereof, and wherein if one of the at least one co-blowing agent is a physical co-blowing agent being isobutane, the blowing agent blend comprises less than 70 mol % isobutane.

36. The blowing agent blend of claim 35, wherein the co-blowing agent includes at least one physical co-blowing agent, the at least one physical co-blowing agent being methane, ethane, n-propane, n-butane, isobutane, cyclopropane, nitrogen, argon, carbon dioxide, sulfur hexafluoride, nitrous oxide, dimethyl ether, 1,1-difluoroethane (HFC-152a), 1,1,1-trifluoroethane (HFC-143a), 1,1,1,2-tetrafluoroethane (HFC-134a), 1,1,2,2-tetrafluoroethane (HFC-134), 1,1,1,3,3-pentafluoropropane (HFC-245fa), or combinations thereof.

37. The blowing agent blend of claim 35, wherein the blowing agent blend comprises from about 10 mol % to about 60 mol % isopentane.

38. The blowing agent blend of claim 37, wherein the blowing agent blend comprises from about 25 mol % to about 40 mol % isopentane.

39. A process for making a low density polyethylene foam structure prepared by the process comprising the acts of:

melting a low density polyethylene polymer;

dissolving an effective amount of a blowing agent blend in the low density polyethylene polymer, the blowing agent blend comprising from about 10 to about 99 mol % isopentane and at least one co-blowing agent, the co-blowing agent being (i) a physical co-blowing agent having a boiling point less than 28° C., (ii) a chemical co-blowing agent, or (iii) combinations thereof, and wherein if one of the at least one co-blowing agent is a physical co-blowing agent being isobutane, the blowing agent blend comprises less than 70 mol % isobutane;

forming an extrudate;

transferring the extrudate to an expansion zone; and permitting the extrudate to expand in the expansion zone to produce the low density polyethylene structure.

40. The process of claim 39 further including melting a stability control agent, mixing a nucleating agent, the stability control agent and the thermoplastic polyolefin polymer to form a mixture, and dissolving an effective amount of the blowing agent blend into the mixture.

41. The process of claim 40, wherein the nucleating agent is talc, and the stability control agent is glycerol monostearate.

42. The process of claim 39, wherein the co-blowing agent includes at least one physical co-blowing agent, the at least one physical co-blowing agent being methane, ethane, n-propane, n-butane, isobutane, cyclopropane, nitrogen, argon, carbon dioxide, sulfur hexafluoride, nitrous oxide, dimethyl ether, 1,1-difluoroethane (HFC-152a), 1,1,1-trifluoroethane (HFC-143a), 1,1,1,2-tetrafluoroethane (HFC-134a), 1,1,2,2-tetrafluoroethane (HFC-134), 1,1,1,3,3-pentafluoropropane (HFC-245fa), or combinations thereof.

43. The process of claim 39, wherein the blowing agent blend includes a chemical co-blowing agent.

44. The process of claim 39, wherein the blowing agent blend comprises from about 10 mol % to about 60 mol % isopentane.

45. The process of claim 44, wherein the blowing agent blend comprises from about 25 mol % to about 40 mol % isopentane.

46. The process of claim 39, wherein the low density polyethylene foam has a density of less than 3 lb/ft$^3$.

47. The blowing agent blend of claim 1, wherein the blowing agent blend comprises isopentane and isobutane, the blowing agent comprises less than 70 mol % isobutane.

48. The blowing agent blend of claim 47, wherein the blowing agent blend further includes at least one additional co-blowing agent selected from the group consisting of methane, ethane, n-propane, cyclopropane, and n-butane.

49. The blowing agent blend of claim 1, wherein the blowing agent blend comprises less than 99 mol % isopentane and (i) at least one physical co-blowing hydrocarbon agent having a boiling point less than 28° C. and the at least one physical co-blowing hydrocarbon agent not being isobutane, (ii) at least one physical non-hydrocarbon co-blowing agent having a boiling point less than 28° C., (iii) at least one chemical co-blowing agent, or (iv) combinations thereof.

50. The blowing agent blend of claim 49, wherein the blowing agent blend comprises less than 99 mol % isopentane and at least one physical hydrocarbon co-blowing agent selected from the group consisting of methane, ethane, n-propane, cyclopropane, and n-butane.

51. The blowing agent blend of claim 1, wherein the blowing agent blend comprises less than 99 mol % isopentane and at least one physical non-hydrocarbon co-blowing agent having a boiling point less than 28° C.

52. The process of claim 22, wherein the blowing agent blend comprises isopentane and isobutane, the blowing agent comprises less than 70 mol % isobutane.

53. The process of claim 52, wherein the blowing agent blend further includes at least one additional co-blowing agent selected from the group consisting of methane, ethane, n-propane, cyclopropane, and n-butane.

54. The process of claim 22, wherein the blowing agent blend comprises less than 99 mol % isopentane and (i) at least one physical co-blowing hydrocarbon agent having a boiling point less than 28° C. and the at least one physical co-blowing hydrocarbon agent not being isobutane, (ii) at least one physical non-hydrocarbon co-blowing agent having a boiling point less than 28° C., (iii) at least one chemical co-blowing agent, or (iv) combinations thereof.

55. The process of claim 54, wherein the blowing agent blend comprises less than 99 mol % isopentane and at least one physical hydrocarbon co-blowing agent selected from the group consisting of methane, ethane, n-propane, cyclopropane, and n-butane.

56. The process of claim 22, wherein the blowing agent blend comprises less than 99 mol % isopentane and at least one physical non-hydrocarbon co-blowing agent having a boiling point less than 28° C.

57. A blowing agent blend for making polyolefin foams comprising (i) isopentane, (ii) isobutane, and (iii) at least one of the co-blowing agents selected from the group consisting of n-propane, 1,1,1,2-tetrafluoroethane (HFC-134a), dimethyl ether, ethane, butane, and combinations thereof, and wherein the blowing agent blend comprises less than 70 mol % isobutane.

58. The blowing agent blend of claim 57, wherein the blowing agent blend consists essentially of (i) isopentane, (ii) isobutane, and (iii) at least one of the co-blowing agents selected from the group consisting of n-propane, 1,1,1,2-tetrafluoroethane (HFC-134a), dimethyl ether, and combinations thereof.

59. The blowing agent blend of claim 57, wherein the blowing agent blend comprises at least 10 mol % isopentane.

60. A process for making a polyolefin foam structure comprising the acts of:

melting a thermoplastic polyolefin polymer;

dissolving an effective amount of a blowing agent blend in the polyolefin polymer, the blowing agent blend comprising (i) isopentane, (ii) isobutane, and (iii) at least one of the co-blowing agents selected from the group consisting of n-propane, 1,1,1,2-tetrafluoroethane (HFC-134a), dimethyl ether, ethane, butane, and combinations thereof, and wherein the blowing agent blend comprises less than 70 mol % isobutane;

forming an extrudate;
transferring the extrudate to an expansion zone; and
permitting the extrudate to expand in the expansion zone to produce the polyolefin foam structure.

61. The process of claim 60, wherein the blowing agent blend consists essentially of (i) isopentane, (ii) isobutane, and (iii) at least one of the co-blowing agents selected from the group consisting of n-propane, 1,1,1,2-tetrafluoroethane (HFC-134a), dimethyl ether, and combinations thereof.

62. The process of claim 60, wherein the blowing agent blend comprises at least 10 mol % isopentane.

* * * * *